United States Patent
Onuma et al.

(10) Patent No.: US 12,088,228 B2
(45) Date of Patent: Sep. 10, 2024

(54) POWER CONVERSION DEVICE AND CONTROL METHOD THEREOF

(71) Applicant: Hitachi Industrial Equipment Systems Co., Ltd., Tokyo (JP)

(72) Inventors: Yusaku Onuma, Tokyo (JP); Takuya Sugimoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 102 days.

(21) Appl. No.: 17/911,175

(22) PCT Filed: May 8, 2020

(86) PCT No.: PCT/JP2020/018609
§ 371 (c)(1),
(2) Date: Sep. 13, 2022

(87) PCT Pub. No.: WO2021/224976
PCT Pub. Date: Nov. 11, 2021

(65) Prior Publication Data
US 2023/0104331 A1 Apr. 6, 2023

(51) Int. Cl.
*H02P 27/08* (2006.01)
*H02M 7/537* (2006.01)

(52) U.S. Cl.
CPC .......... *H02P 27/085* (2013.01); *H02M 7/537* (2013.01)

(58) Field of Classification Search
CPC .............................. H02P 27/085; H02M 7/537
(Continued)

(56) References Cited

U.S. PATENT DOCUMENTS

2012/0026758 A1* 2/2012 Lee ................... H02M 3/33576
363/21.13

FOREIGN PATENT DOCUMENTS

JP 10-248262 A 9/1998
JP 2009213321 A * 9/2009
(Continued)

OTHER PUBLICATIONS

International Search Report (PCT/ISA/210) issued in PCT Application No. PCT/JP2020/018609 dated Jun. 23, 2020 with English translation (four (4) pages).
(Continued)

*Primary Examiner* — Kawing Chan
(74) *Attorney, Agent, or Firm* — Crowell & Moring LLP

(57) ABSTRACT

The purpose of the present invention is to provide a power conversion device capable of suppressing an increase in current flowing through a motor even if a voltage command exceeds the amplitude of a carrier wave. To achieve the above purpose, a power conversion device, which controls the drive of a three-phase motor by converting a DC voltage into a voltage command-based voltage through the operation of a switching circuit, comprises: a DC voltage detector which detects a DC voltage; a norm generator which generates a voltage command norm from the voltage command; a modulated wave generator which generates a first modulated wave from the detected DC voltage and the voltage command norm; and a control signal generator which generates a control signal for controlling the operation of the switching circuit from the first modulated wave and the carrier wave, wherein the modulated wave generator generates, for one phase at the timing of the maximum or minimum value of the voltage command, a first modulated wave having a magnitude of ½ of the detected DC voltage, and generates, for the remaining two phases, a first modu-
(Continued)

lated wave having a magnitude based on the detected DC voltage and voltage command norm.

14 Claims, 5 Drawing Sheets

(58) Field of Classification Search
USPC .......................................................... 318/503
See application file for complete search history.

(56) References Cited

FOREIGN PATENT DOCUMENTS

| JP | 2009-303346 A | 12/2009 |
|----|---------------|---------|
| JP | 2012-95412 A  | 5/2012  |
| JP | 2019-146360 A | 8/2019  |

OTHER PUBLICATIONS

Japanese-language Written Opinion (PCT/ISA/237) issued in PCT Application No. PCT/JP2020/018609 dated Jun. 23, 2020 (three (3) pages).
Extended European Search Report issued in European Application No. 20934324.3 dated Dec. 13, 2023 (9 pages).
Hava, A. M. et al., "Carrier-Based PWM-VSI Overmodulation Strategies: Analysis, Comparison, and Design", IEEE Transactions on Power Electronics, Jul. 1998, pp. 674-689, vol. 13, No. 4, XP011043188 (16 Pages).

* cited by examiner

POWER CONVERSION DEVICE AND CONTROL METHOD THEREOF

TECHNICAL FIELD

The present invention relates to a power conversion device.

BACKGROUND ART

As a background art in this technical field, there is JP H10-248262 A (Patent Document 1).

In order to realize a power conversion device in which the fundamental component of the output voltage can be increased with a simple control circuit without increasing the harmonic component of the output voltage, and in which the torque pulsation during motor drive is small, Patent Document 1 describes that a comparator for comparing the magnitudes of three-phase voltage commands and calculating an intermediate value excluding the maximum value and the minimum value and an adder for adding a value obtained by multiplying the intermediate value by half to each phase voltage command are provided and the output of the adder is newly used as a voltage command value.

CITATION LIST

Patent Document

Patent Document 1: JP H10-248262 A

SUMMARY OF THE INVENTION

Problems to be Solved by the Invention

Since the technology of the Patent Document 1 can reduce the peak value of the voltage command, the maximum value of the fundamental wave component of the output voltage can be increased by increasing the voltage command. However, there is a problem that, when the output of the adder exceeds the amplitude of the carrier wave, the fundamental wave component of the output voltage becomes lower than the fundamental wave component of the voltage command and accordingly the current flowing through the motor increases.

Therefore, it is an object of the present invention to provide a power conversion device capable of suppressing an increase in a current flowing through a motor even if a voltage command exceeds the amplitude of a carrier wave and a control method thereof.

Solutions to Problems

The present invention is, for example, a power conversion device that controls driving of a three-phase motor by converting a DC voltage into a voltage based on a voltage command by an operation of a switching circuit. The power conversion device includes: a DC voltage detector for detecting a DC voltage, a norm generator for generating a voltage command norm from the voltage command, a modulated wave generator generates a first modulated wave from the detected DC voltage and the voltage command norm, a control signal generator for generating a control signal for controlling operation of the switching circuit from the first modulated wave and a carrier wave. The modulated wave generator generates a first modulated wave having a magnitude of ½ of the detected DC voltage for one phase at the timing of the maximum value or the minimum value of the voltage command, and for the remaining two phases, a first modulated wave having a magnitude based on the detected DC voltage and t

Effects of the Invention

According to the present invention, it is possible to provide a power conversion device capable of suppressing an increase in a current flowing through a motor even if a voltage command exceeds the amplitude of a carrier wave and a control method thereof.

MODE FOR CARRYING OUT THE INVENTION

Hereinafter, embodiments of the present invention will be described with reference to the diagrams.

As a premise of the following explanation, the reference phase of the three-phase is a U phase, phases having a phase difference of $\pm 2\pi/3$ rad from the U phase are a V phase and a W phase, respectively.

When the sum of the three phases is zero, the Euclidean norm of the three phases (hereinafter referred to as the norm) can be obtained by squaring the absolute value of each phase and using the square root of the sum of them. If the sum of the three phase is not zero, the norm may be calculated after removing the zero-phase component from each phase. The zero-phase component can be calculated by dividing the sum of the three-phase by 3. Hereinafter, the three-phase will refer to those after the removal of zero-phase. When three phases are transformed into a two-phase fixed coordinate system (Clark transform) or into a two-phase rotational coordinate system (Park transform), the norm can be obtained by squaring the absolute value of each phase and using the square root of the sum of them.

Furthermore, the norm of the three-phase phase voltage is multiplied by $\sqrt{2}/\sqrt{3}$, and the norm of the phase voltage of the two-phase fixed coordinate system and the norm of the phase voltage of the two-phase rotational coordinate system are multiplied by the value corresponding to the coefficient multiplied at the time of park conversion, so that each corresponds to the amplitude of the three-phase phase voltage. Therefore, in the present embodiment, the norm of the phase voltage of the three-phase, the norm of the phase voltage of the two-phase fixed coordinate system, the norm of the phase voltage of the two-phase rotational coordinate system, and the three-phase voltage amplitude are treated as the same physical quantity.

In the case of the two-phase fixed coordinate system or the two-phase rotational coordinate system, it may be inverted to three-phase and treated as a three-phase system.

First Embodiment

Figure 1:
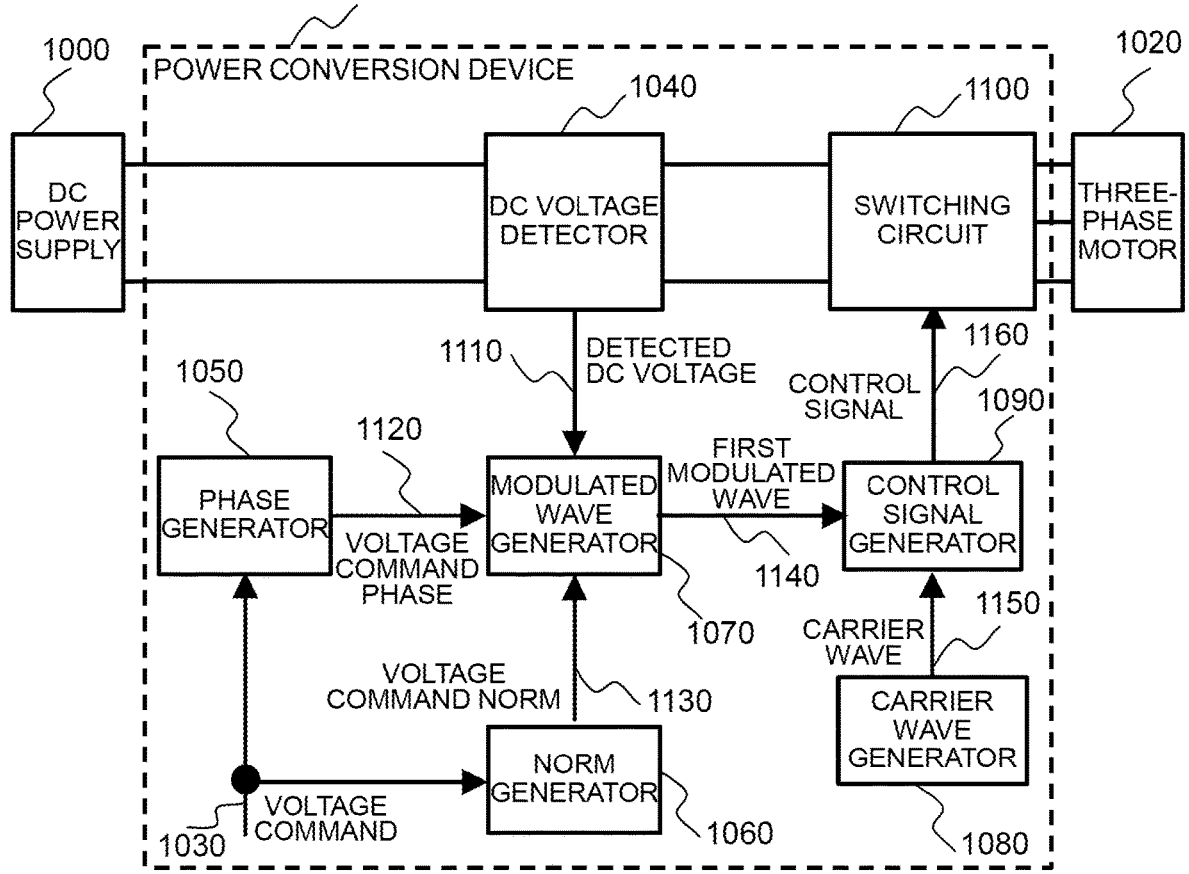
FIG. 1 is a configuration diagram of a motor driving system according to a first embodiment.

FIG. 1 is a configuration diagram of a motor driving system according to a present embodiment.

The motor driving system of the present embodiment includes a DC power supply 1000, a power conversion device 1010, and a three-phase motor 1020, and the DC voltage supplied from the DC power supply 1000 is converted into a voltage based on the voltage command 1030 by the power conversion device 1010 to control the driving of the three-phase motor 1020.

In FIG. 1, the power conversion device 1010 includes a DC voltage detector 1040, a phase generator 1050, a norm generator 1060, a modulated wave generator 1070, a carrier wave generator 1080, a control signal generator 1090, and a switching circuit 1100.

The DC voltage detector 1040 detects a DC voltage and outputs a detected DC voltage 1110.

The phase generator 1050 generates a voltage command phase 1120 from the voltage command 1030. The voltage command phase 1120 can be obtained, for example, by Clark transforming the voltage command 1030 and taking an inverse tangent. If the voltage command phase 1120 is known, it is not necessary to have the phase generator 1050.

The norm generator 1060 generates the voltage command norm 1130 from the voltage command 1030.

The modulated wave generator 1070 generates a first modulated wave 1140 from the voltage command phase 1120, the voltage command norm 1130, and the detected DC voltage 1110.

The carrier wave generator 1080 generates a carrier wave 1150. The carrier wave 1150 in the present embodiment uses a triangular wave having a period within the fundamental wave period of the voltage command 1030 or the first modulated wave 1140, but a sawtooth wave may also be used.

The control signal generator 1090 generates a control signal 1160 for ON/OFF control of the switching circuit 1100 by comparing the first modulated wave 1140 with a carrier wave 1150. In addition, the control signal 1160 is a signal modulated by a modulation method so-called PWM, and this modulation method is a method well known to those skilled in the art. Therefore, the details of the control signal generator 1090 will be omitted.

The switching circuit 1100 performs ON/OFF switching according to the control signal 1160 and converts the DC voltage output from the DC power supply 1000 into a voltage based on the voltage command 1030.

In addition, although the DC power supply 1000 is used in the present embodiment, a single-phase or multi-phase AC power supply may be used instead of the DC power supply 1000. In this case, a rectifier circuit and a smoothing circuit are added to the power conversion device 1010, and a DC voltage can be obtained by rectifying the AC voltage output from the AC power supply with the rectifier circuit and smoothing the AC voltage with the smoothing circuit.

The three-phase motor 1020 includes a three-phase induction motor, a three-phase permanent magnet synchronous motor, and a three-phase synchronous reluctance motor, and the like.

The voltage command 1030 for controlling the driving of the three-phase motor 1020 can be obtained by V/f constant control (only in the case of a three-phase induction motor), sensorless vector control made by adding a current detector for detecting the current flowing through the three-phase motor 1020 to the power conversion device 1010, or vector control made by adding the current detector and a position detector for detecting the rotor position of the three-phase motor 1020 to the power conversion device 1010. The current detector detects three-phase currents. However, in addition to the method of directly detecting three phases, a method may be used in which two phases are detected and the remaining one phase is found from the two phases from the fact that the sum of the three-phase AC currents is zero. In addition, a shunt resistor may be provided on the positive electrode side or the negative electrode side of the switching circuit 1100, and a three-phase current may be obtained from the current flowing through the shunt resistor. The position detector may detect the rotor speed of the three-phase motor 1020 and obtain the rotor position by using the fact that the speed and the position have a calculus relationship.

Figure 2:
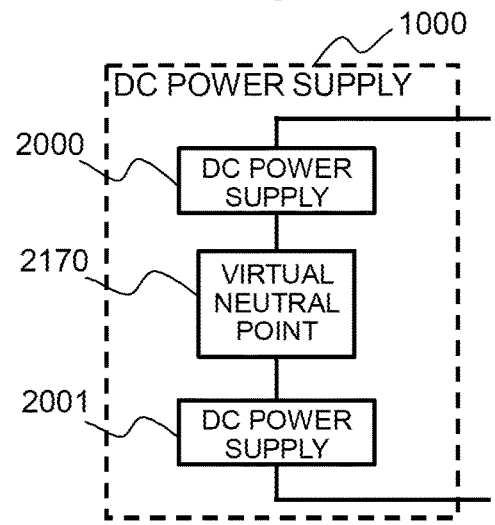
FIG. 2 is a configuration diagram of a DC power supply when a virtual neutral point is introduced according to the first embodiment.

Hereinafter, the effects in the present embodiment will be described. For the sake of simplicity, as shown in FIG. 2, a virtual neutral point 2170 is introduced into the DC power supply 1000. In this case, the DC power supply 2000 and the DC power supply 2001 output half the voltage of the DC power supply 1000, and the amplitude of the carrier wave 1150 can be considered as half the output voltage of the DC power supply 1000.

First, a case where the technique of the present embodiment is not used, that is, a case where the voltage command 1030 is input to the control signal generator 1090 (hereinafter, referred to as a conventional technique) instead of the first modulated wave 1140 will be described.

Figure 3:
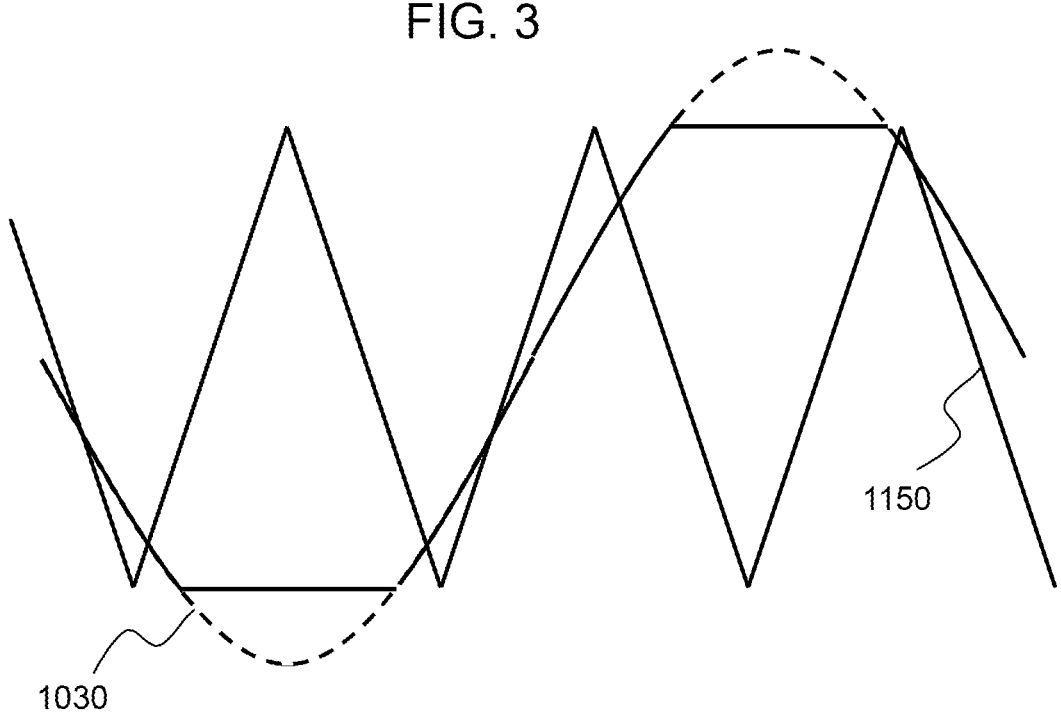
FIG. 3 is a diagram showing a relationship between a conventional voltage command and a carrier wave.

The control signal generator 1090 compares the voltage command 1030 which becomes a modulated wave with a carrier wave 1150 and outputs the control signal 1160. However, as shown in FIG. 3, if the amplitude of the voltage command 1030 increases, the voltage command 1030, which should originally be a broken line, is limited by the amplitude of the carrier wave 1150, and the control signal 1160 corresponding to the solid line of the voltage command 1030 is output.

When the voltage command which becomes a modulated wave is a sine (cosine) wave, if the percentage (hereinafter, referred to as a voltage utilization rate) of half the voltage output from the DC power supply 1000 and the voltage command norm 1130 exceeds 100%, these are limited by the amplitude of the carrier wave 1150 as described above. Therefore, a norm of voltage applied to the three-phase motor 1020 (hereinafter, referred to as a output voltage norm) becomes lower than the voltage command norm 1130. Even when the technique described in Patent Document 1 is used, the fundamental component of the output voltage can be $2/\sqrt{3}$ times larger than that of the conventional technique, but when the voltage utilization ratio exceeds $200/\sqrt{3}$%, the output voltage norm becomes smaller than the voltage command norm 1130 as in the conventional technique. Therefore, the current flowing through the three-phase motor 1020 increases.

Next, a case where the technique of the present embodiment is used will be described.

Figure 4:
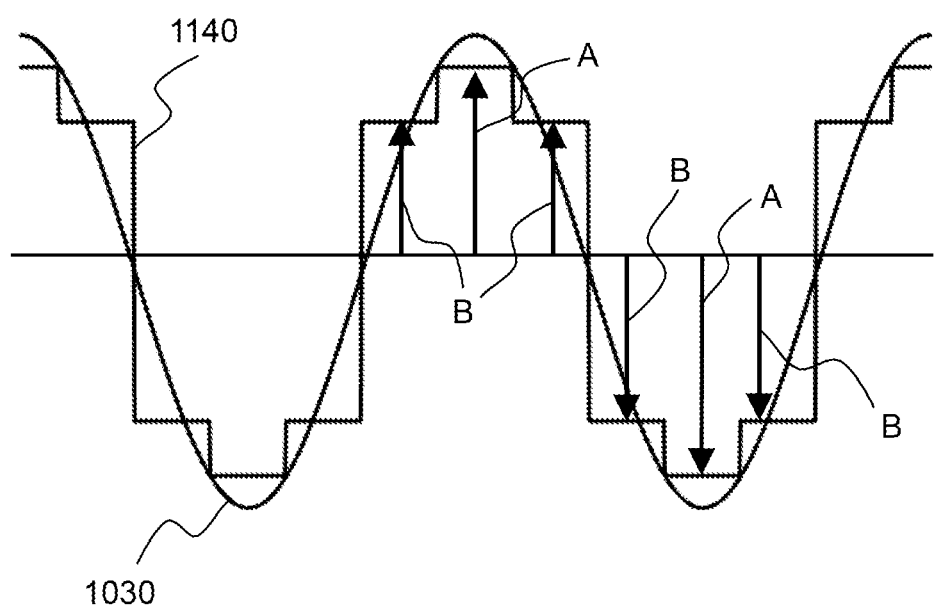
FIG. 4 is a diagram showing a relationship between a voltage command and a first modulated wave in the first embodiment.

FIG. 4 is a diagram showing a relationship between a voltage command 1030 and a first modulated wave 1140 generated by the modulated wave generator 1070 in the present embodiment. The modulated wave generator 1070 generates a convex waveform having the same phase as the voltage command 1030 as shown in FIG. 4, and outputs it as the first modulated wave 1140. It is desirable that the phases of the voltage command 1030 and the first modulated wave 1140 are the same. However, this does not apply if a voltage (pulse shape) applied to the three-phase motor 1020 is demodulated at the period of the voltage pulse (same as the period of the carrier wave 1150) and the observed voltage is a convex waveform as shown in FIG. 4. Since the three-phase have a phase difference of $\pm 2\pi/3$ rad, a one-phase convex waveform may be generated, and convex waveforms having a phase difference of $\pm 2\pi/3$ rad may be generated for the remaining two phases.

As shown in FIG. 4, the amplitude A indicating the maximum value of the convex waveform generated by the modulated wave generator 1070 is ½ of the DC voltage (amplitude of the carrier wave 1150) and both ends B are the difference between ³⁄₂ of the voltage command norm 1130 and ½ of the DC voltage (amplitude of the carrier wave 1150), if the voltage utilization rate is within 400/3%, compared with the conventional technique, the voltage utilization rate at which the voltage command norm and the output voltage norm match each other is ⁴⁄₃ times (=(400/3%)/(100%)).

Compared with the technique of Patent Document 1, the voltage utilization rate at which the voltage command norm 1130 and the output voltage norm match each other is $2/\sqrt{3}$ times (=(400/3%)/(200/$\sqrt{3}$%)).

In addition, even when the voltage utilization rate is 400/3% or more, it is possible to suppress a decrease in the output voltage norm as compared with the conventional technique and the technique of Patent Document 1.

The relationship in the three phases of the first modulated wave 1140 generated by the modulated wave generator 1070 is as follows. The relationship in the three phases is that the first modulated wave with a magnitude of ½ of the DC voltage is generated for one phase at the timing of the maximum or minimum value of the voltage command (this is called the maximum or minimum phase), and for the remaining two phases, since the phase difference is $\pm 2\pi/3$ rad, the first modulated wave is generated based on the difference between ³⁄₂ of the voltage command norm 1130 and ½ of the DC voltage, i.e. the DC voltage and the voltage command norm.

As described above, by using the technique of the present embodiment, it is possible to suppress an increase in the current flowing through the three-phase motor 1020 even if the voltage command 1030 exceeds the amplitude of the carrier wave 1150.

Second Embodiment

Figure 5:
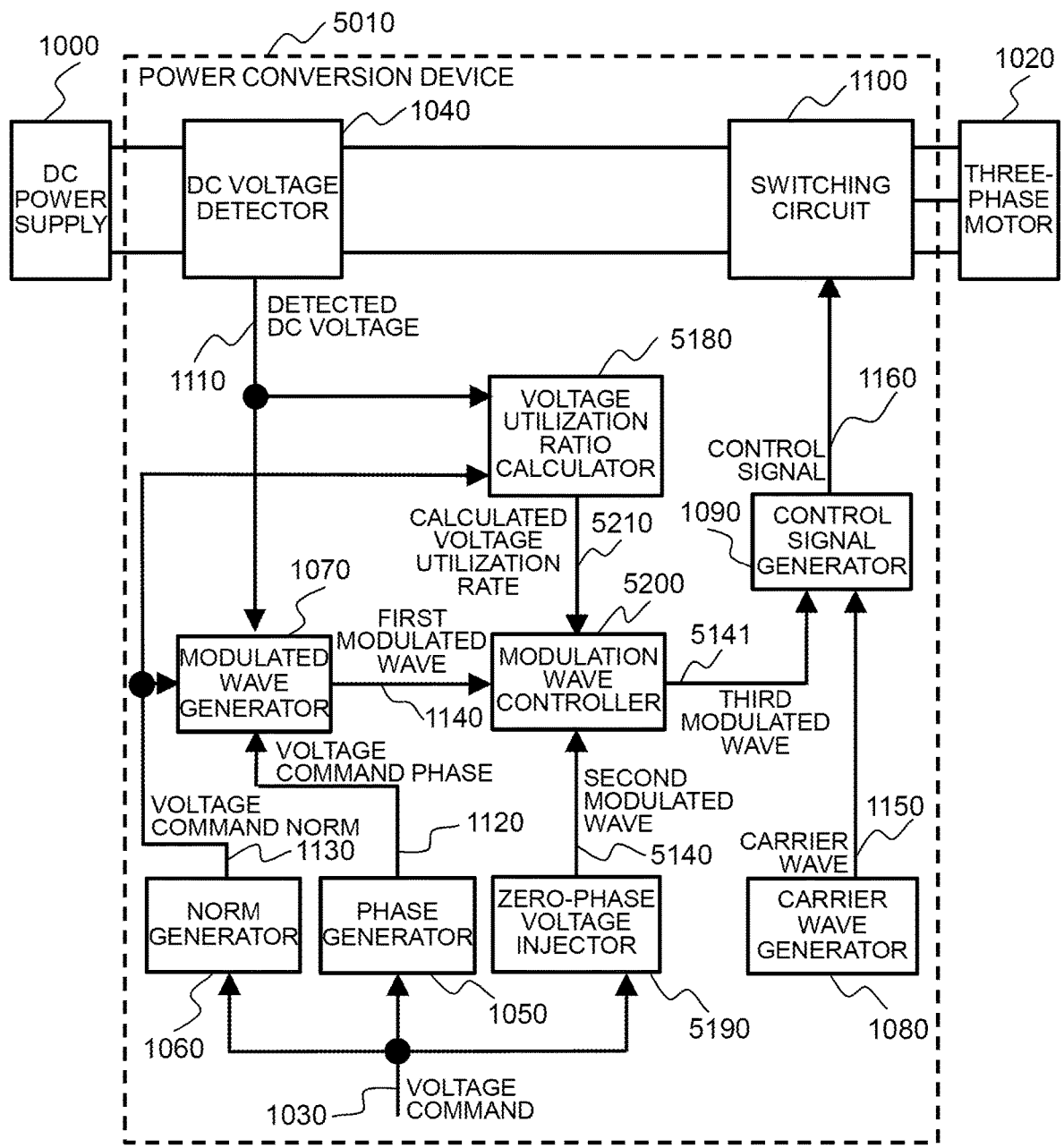
FIG. 5 is a configuration diagram of a motor driving system according to a second embodiment.

FIG. 5 is a configuration diagram of a motor driving system according to the present embodiment. In FIG. 5, configurations that have the same functions as those in FIG. 1 are denoted by the same reference numerals, and the description thereof will be omitted. In FIG. 5, the points that differ from FIG. 1 are the points with voltage utilization ratio calculator 5180, zero-phase voltage injector 5190, and modulated wave controller 5200.

In FIG. 5, the voltage utilization rate calculator 5180 calculates the voltage utilization rate from the voltage command norm 1130 and the detected DC voltage 1110, and outputs it as the calculated voltage utilization rate 5210.

The zero-phase voltage injector 5190 injects a zero-phase voltage into the voltage command 1030 and outputs the result as a second modulated wave 5140. Examples of the zero-phase voltage to be injected include "a value obtained by calculating an intermediate value excluding the maximum value and the minimum value and multiplying the intermediate value by half by a comparator that compares the magnitudes of three-phase voltage commands" described in Patent Document 1, the third harmonic of the voltage command 1030, a difference between the maximum phase of the voltage command 1030 and half of the detected DC voltage 1110, and a difference between the minimum phase of the voltage command 1030 and a value obtained by multiplying half of the detected DC voltage 1110 by −1. However, zero, that is, the voltage command 1030 may be output as it is as the second modulated wave 5140.

The modulated wave controller 5200 controls switching between the first modulated wave 1140 and the second modulated wave 5140 based on the calculated voltage utilization rate 5210, and outputs the third modulated wave 5141.

In the carrier wave generator 1080 in this embodiment, the carrier wave 1150 to be generated uses a triangular wave having a period within the fundamental wave period of the voltage command 1030, the first modulated wave 1140, the second modulated wave 5140, or the third modulated wave 5141, but a sawtooth wave may also be used.

Further, the control signal generator 1090 in this embodiment generates a control signal 1160 for controlling the on/off of the switching circuit 1100 by comparing the third modulated wave 5141 with the carrier wave 1150.

Hereinafter, the control of switching between the first modulated wave 1140 and the second modulated wave 5140 based on the calculated voltage utilization rate 5210 will be described.

As described above, if the calculated voltage utilization rate 5210 is within 100% in the conventional technique and within 200/$\sqrt{3}$% in the technique of Patent Document 1, the voltage command norm 1130 and the output voltage norm match each other. Therefore, if the calculated voltage utilization rate 5210 is within 100% to 200/$\sqrt{3}$%, the second modulated wave 5140 is output as the third modulated wave 5141, and if it exceeds 100% to 200/$\sqrt{3}$%, first modulated wave 1140 is output as the third modulated wave 5141. As a result, it is possible to apply a voltage corresponding to a sine (cosine) wave to the three-phase motor 1020 when the calculated voltage utilization rate 5210 is low while matching the voltage command norm 1130 and the output voltage norm.

In addition, in order to prevent discontinuity of the modulated wave when switching between the first modulated wave 1140 and the second modulated wave 5140, when the calculated voltage utilization rate 5210 exceeds 100% to 200/$\sqrt{3}$%, the transition from the second modulated wave 5140 to the first modulated wave 1140 may be performed according to the calculated voltage utilization rate 5210. In addition, as described above, if the calculated voltage utilization rate 5210 is within 400/3% by using the technique of the present embodiment, the voltage command norm 1130 and the output voltage norm match each other. Therefore, the transition to the first modulated wave 1140 may be completed when the calculated voltage utilization rate 5210 is 400/3%.

Third Embodiment

Figure 6:
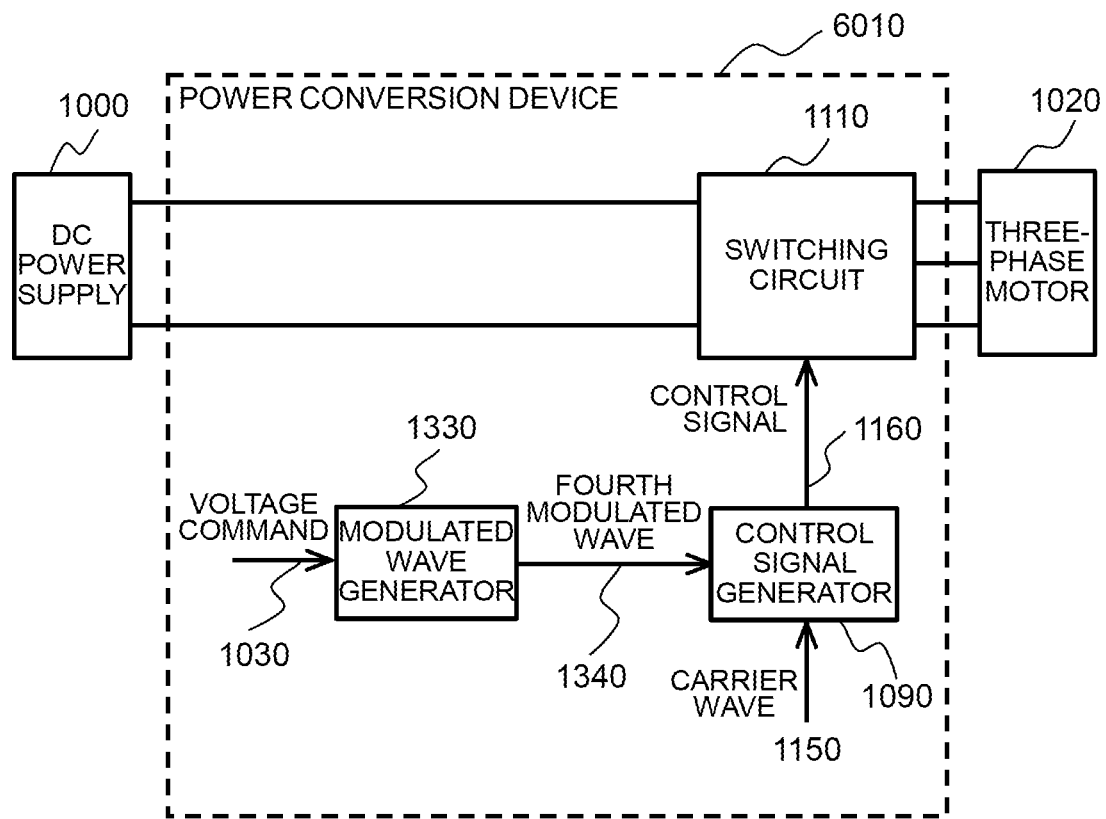
FIG. 6 is a configuration diagram of a motor driving system according to a third embodiment.

FIG. 6 is a configuration diagram of a motor driving system according to the present embodiment. In FIG. 6, configurations that have the same functions as those in FIG. 1 are denoted by the same reference numerals, and the description thereof will be omitted.

In FIG. 6, the difference from FIG. 1 is that it has a modulated wave generator 1330, and the power conversion device 6010 has a modulated wave generator 1330, a control signal generator 1090, and a switching circuit 1100.

The modulated wave generator 1330 generates a fourth modulated wave 1340 based on the norm of the voltage command 1030 (hereinafter referred to as the voltage command norm).

The control signal generator 1090 in this embodiment generates a control signal 1160 that controls the on/off of the switching circuit 1100 by comparing the fourth modulated wave 1340 with the carrier wave 1150.

In the modulated wave generator 1330, the voltage command norm and the phase of the voltage command (hereinafter referred to as voltage phase) are obtained from the voltage command, and a square wave having an amplitude based on the voltage command norm and a phase based on the voltage phase is generated and output as the fourth modulated wave 1340.

Figure 7:
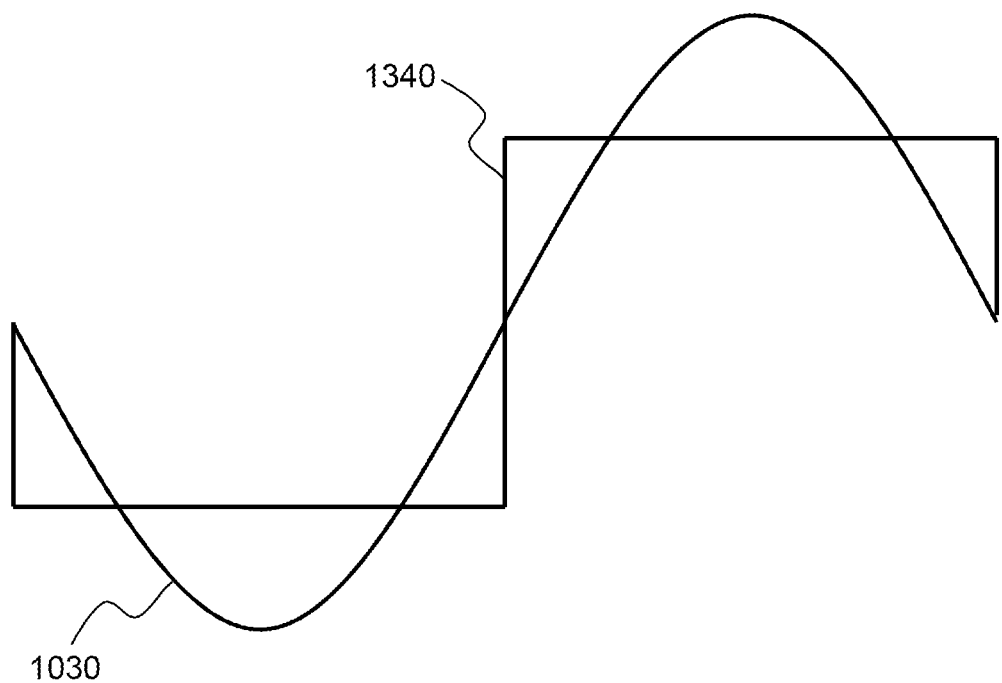
FIG. 7 is a diagram showing a relationship between a voltage command and a fourth modulated wave in the third embodiment.

FIG. 7 is a diagram showing a relationship between a voltage command and a fourth modulated wave in the present embodiment. As shown in FIG. 7, it is desirable that the phases of the voltage command 1030 and the fourth modulated wave 1340 are the same. However, this does not apply if a voltage (pulse shape) applied to the three-phase motor 1020 is demodulated at the period of the voltage pulse (same as the period of the carrier wave 1150) and the observed voltage is a square wave. The voltage phase can be calculated, for example, by performing coordinate conversion (Clark conversion) of a three-phase into a two-phase AC current and taking an inverse tangent. Since the three-phase have a phase difference of ±2π/3 rad, a one-phase square wave may be generated, and square waves having a phase difference of ±2π/3 rad may be generated for the remaining two phases. If the voltage command norm and the voltage phase are known in advance, the voltage command norm and the voltage phase may be directly input to the modulated wave generator 1030 instead of the voltage command 1020.

When the amplitude of the square wave generated by the modulated wave generator 1330, that is, the amplitude of the fourth modulated wave 1340 is ¾ of the voltage command norm, if the voltage utilization rate is within 400/3%, the voltage command norm and the output voltage norm match each other. Therefore, compared with the conventional technique, the voltage utilization rate at which the voltage command norm and the output voltage norm match each other is 4/3 times (=(400/3%)/(100%)).

Compared with the technique of Patent Document 1, the voltage utilization rate at which the voltage command norm and the output voltage norm match each other is 2/√3 times (=(400/3%)/(200/√3%)).

In addition, even when the voltage utilization rate is 400/3% or more, it is possible to suppress a decrease in the output voltage norm as compared with the conventional technique and the technique of Patent Document 1.

As described above, by using the technique of the present embodiment, it is possible to suppress an increase in the current flowing through the three-phase motor 1020 even if the voltage command 1030 exceeds the amplitude of the carrier wave 1150.

Forth Embodiment

Figure 8:
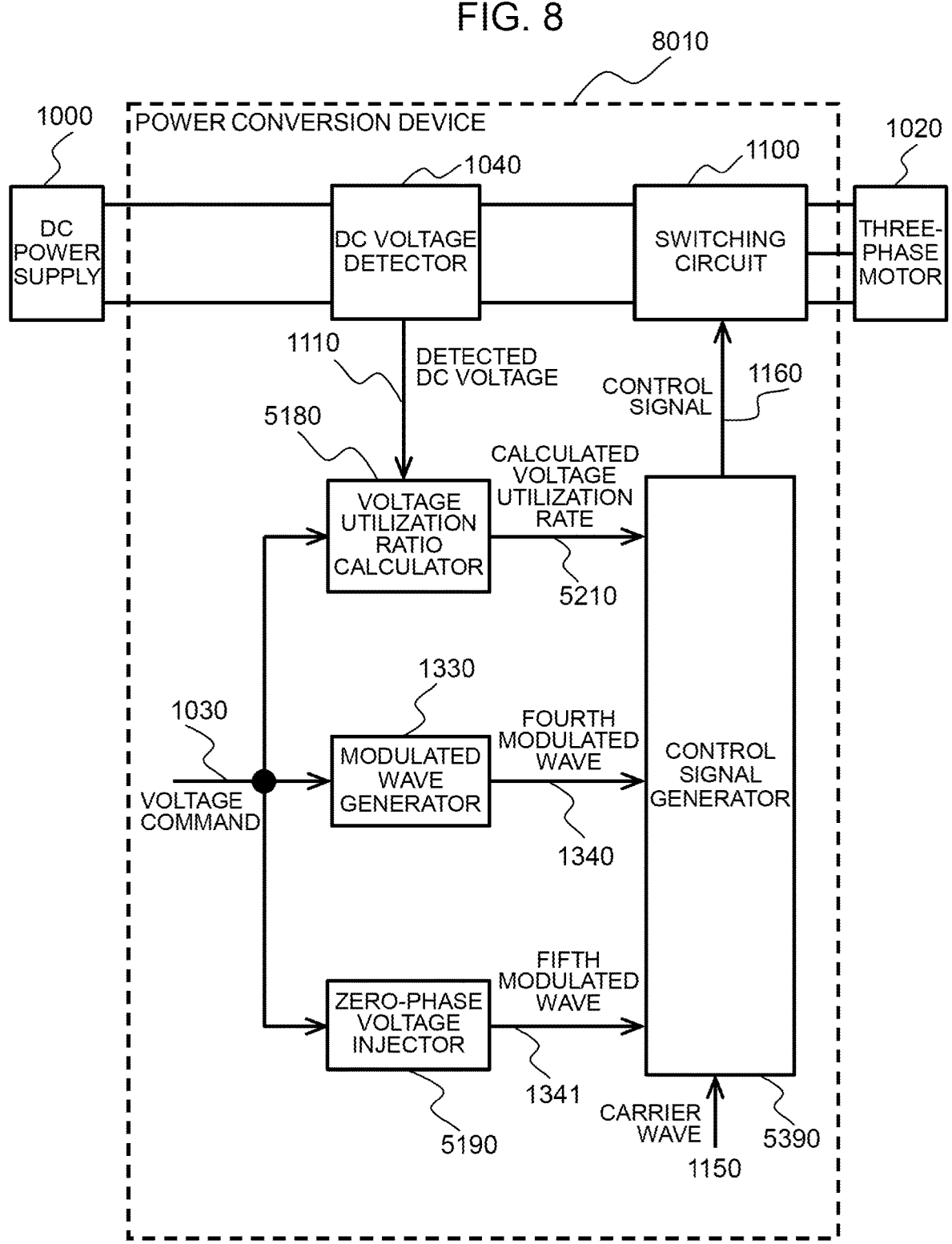
FIG. 8 is a configuration diagram of a motor driving system according to a fourth embodiment.

FIG. 8 is a configuration diagram of a motor driving system according to a fourth embodiment. In FIG. 8, parts common to those in FIGS. 5 and 6 are denoted by the same reference numerals, and the description thereof will be omitted.

In FIG. 8, a power conversion device 8010 for controlling the driving of the three-phase motor 1020 includes a DC voltage detector 1040, a voltage utilization rate calculator 5180, a modulated wave generator 1330, a zero-phase voltage injector 5190, a control signal generator 5390, and a switching circuit 1100.

The voltage utilization rate calculator 5180 calculates a calculated voltage utilization rate 5210 from the voltage command 1030 and a detected DC voltage 1110. If the voltage command norm is known in advance, the voltage command norm may be directly input to the voltage utilization rate calculator 5180 instead of the voltage command 1030.

The zero-phase voltage injector 5190 injects a zero-phase voltage into the voltage command 1030 and outputs the result as a fifth modulated wave 1341.

The control signal generator 5390 controls switching between the fourth modulated wave 1340 and the fifth modulated wave 1341 based on the calculated voltage utilization rate 5210, and generates the control signal 1160 for ON/OFF control of the switching circuit 1100 by comparing the switched modulated wave with the carrier wave. In general, a triangular wave having a period within the fundamental wave period of the switched modulated wave is used as the carrier wave. A sawtooth wave may be used instead of the triangular wave.

Hereinafter, the control of switching between the fourth modulated wave 1340 and the fifth modulated wave 1341 based on the calculated voltage utilization rate 5210 will be described.

As described above, if the calculated voltage utilization rate 5210 is within 100% in the conventional technique and within 200/√3% in the technique of Patent Document 1, the voltage command norm and the output voltage norm match each other. Therefore, the fifth modulated wave 1341 is selected if the calculated voltage utilization rate 5210 is within 100% to 200/√3% and the fourth modulated wave 1340 is selected if 100% to 200/√3% is exceeded. By comparing the selected modulated wave with the carrier wave, a voltage corresponding to the sine (cosine) wave can be applied to the three-phase motor 1020 when the calculated voltage utilization rate 5210 is low while matching the voltage command norm and the output voltage norm.

In addition, in order to prevent discontinuity of the modulated wave when switching between the fourth modulated wave 1340 and the fifth modulated wave 1341, when the calculated voltage utilization rate 5210 exceeds 100% to 200/√3%, the fourth modulated wave 1340 and the fifth modulated wave 1341 may be transitioned according to the calculated voltage utilization rate 5210. In addition, as described above, if the calculated voltage utilization rate 5210 is within 400/3% by using the technique of the present embodiment, the voltage command norm and the output voltage norm match each other. Therefore, the transition to the fourth modulated wave may be completed when the calculated voltage utilization rate 5210 is 400/3%.

Although the above embodiments have been described, the present invention is not limited to the embodiments described above, and includes various modification examples. For example, the above embodiments have been described for easy understanding of the present invention, but the present invention is not necessarily limited to having all the components described above. In addition, some of the components in one embodiment can be replaced with the components in another embodiment, and the components in another embodiment can be added to the components in one embodiment. In addition, for some of the components in each embodiment, addition, removal, and replacement of other components are possible.

In addition, each of the above configurations and functions may be realized by software that interprets and executes a program for realizing each function using a processor, or may be realized by hardware, for example, by designing the configurations and functions with an integrated circuit.

REFERENCE SIGNS LIST

1000 DC power supply
1010 Power conversion device
1020 Three-phase motor
1030 Voltage command
1040 DC voltage detector
1050 Phase generator
1060 Norm generator
1070 Modulated wave generator
1080 Carrier wave generator
1090 Control signal generator
1100 Switching circuit
1110 Detected DC voltage
1120 Voltage command phase
1130 Voltage command norm
1140 First modulated wave
1150 Carrier wave
1160 Control signal
1330 Modulated wave generator
1340 Fourth modulated wave
1341 Fifth modulated wave
2000 DC power supply
2001 DC power supply
2170 Virtual neutral point
5010 Power conversion device
5140 Second modulated wave
5141 Third modulated wave
5180 Voltage utilization factor calculator
5190 Zero phase voltage injector
5200 Modulated wave controller
5210 Calculated voltage utilization rate
5390 Control signal generator

The invention claimed is:

1. A power conversion device that controls driving of a three-phase motor by converting a DC voltage into a voltage based on a voltage command by an operation of a switching circuit, the device comprising:
a DC voltage detector that detects the DC voltage;
a norm generator that generates a voltage command norm from the voltage command;
a modulated wave generator that generates a first modulated wave from the detected DC voltage and the voltage command norm; and
a control signal generator that generates a control signal for controlling the operation of the switching circuit from the first modulated wave and a carrier wave,
wherein the modulated wave generator generates, for one phase at the timing of the maximum or minimum value of the voltage command, the first modulated wave having a magnitude of ½ of the detected DC voltage, and generates, for the remaining two phases, the first modulated wave having a magnitude based on the detected DC voltage and voltage command norm.

2. The power conversion device according to claim 1, wherein the first modulated wave for the remaining two phases generated by the modulated wave generator is a modulated wave having a magnitude of a difference between 3/2 of the voltage command norm and ½ of the detected DC voltage.

3. The power conversion device according to claim 1, further comprising:
a voltage utilization rate calculator that calculates a voltage utilization rate from the voltage command and the DC voltage;
a zero-phase voltage injector that injects a zero-phase voltage into the voltage command to generate a second modulated wave; and
a modulated wave controller that generates a third modulated wave based on the first modulated wave, the second modulated wave and the voltage utilization ratio,
wherein the third modulated wave is input to the control signal generator instead of the first modulated wave.

4. The power conversion device according to claim 3, wherein the control signal generator generates the second modulated wave as the third modulated wave when the voltage utilization rate is within 100% to 200/√3%, and generates the first modulated wave as the third modulated wave when the voltage utilization rate exceeds 100% to 200/√3%.

5. The power conversion device according to claim 3, wherein the control signal generator generates the second modulated wave as the third modulated wave when the voltage utilization rate is within 100% to 200/√3%, and generates the third modulated wave by transitioning from the fourth second modulated wave to the first modulated wave when the voltage utilization rate exceeds 100% to 200/√3%.

6. The power conversion device according to claim 5, wherein the control signal generator performs the transition from the second modulated wave to the first modulated wave according to the voltage utilization rate.

7. The power conversion device according to claim 6, wherein the control signal generator completes the transition from the second modulated wave to the first modulated wave when the voltage utilization rate is 400/3%.

8. A control method of a power conversion device that controls driving of a three-phase motor by converting a DC voltage into a voltage based on a voltage command by an operation of a switching circuit, the method comprising:
detecting the DC voltage,
generating a voltage command norm from the voltage command,
generating, for one phase at the timing of the maximum or minimum value of the voltage command, a first modulated wave having a magnitude of ½ of the detected DC voltage, and generating, for the remaining two phases, the first modulated wave having a magnitude based on the detected DC voltage and voltage command norm, and
generating a control signal for controlling the operation of the switching circuit from the first modulated wave and a carrier wave.

9. The control method of a power conversion device according to claim 8,
wherein the first modulated wave for the remaining two phases is a modulated wave having a magnitude of a difference between 3/2 of the voltage command norm and ½ of the detected DC voltage.

10. The control method of a power conversion device according to claim 8,
wherein a voltage utilization rate is calculated from the voltage command and the DC voltage,
a zero-phase voltage is injected into the voltage command to generate a second modulated wave,
a third modulated wave is generated based on the first modulated wave, the third modulated wave and the voltage utilization ratio, and
the control signal for controlling the operation of the switching circuit is generated from the third modulated wave instead of the first modulated wave and the carrier wave.

11. The control method of a power conversion device according to claim 10,
wherein the second modulated wave is generated as the third modulated wave when the voltage utilization rate is within 100% to 200/√3%, the first modulated wave is generated as the third modulated wave when the voltage utilization rate exceeds 100% to 200/√3%.

12. The control method of a power conversion device according to claim 10,
wherein the second modulated wave is generated as the third modulated wave when the voltage utilization rate is within 100% to 200/√3%, and the fourth third modulated wave is generated by transitioning from the second modulated wave to the first modulated wave when the voltage utilization rate exceeds 100% to 200/√3%.

13. The control method of a power conversion device according to claim 12,
wherein the transition from the second modulated wave to the first modulated wave is performed according to the voltage utilization rate.

14. The control method of a power conversion device according to claim 13,
wherein the transition from the second modulated wave to the first modulated wave is completed when the voltage utilization rate is 400/3%.

* * * * *